(12) United States Patent
Petri

(10) Patent No.: US 6,826,190 B1
(45) Date of Patent: Nov. 30, 2004

(54) METHOD FOR CONTROLLING A NETWORK NODE AND A TELECOMMUNICATIONS NETWORK TOGETHER AND A NETWORK NODE

(75) Inventor: Bernhard Petri, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/489,542

(22) Filed: Jan. 21, 2000

Related U.S. Application Data

(63) Continuation of application No. PCT/DE98/01692, filed on Jun. 19, 1998.

(51) Int. Cl.$^7$ .............................................. H04L 12/18
(52) U.S. Cl. ..................................... 370/400; 370/410
(58) Field of Search ............................... 370/351, 389, 370/390, 391, 392, 393, 394, 395, 409, 410, 474, 475, 476, 472, 473, 400, 408, 395.1, 395.2, 395.21, 396, 397

(56) References Cited

U.S. PATENT DOCUMENTS

| | | | | |
|---|---|---|---|---|
| 5,371,735 A | * | 12/1994 | Denneau et al. | 370/351 |
| 5,506,847 A | * | 4/1996 | Shobatake | 370/338 |
| 5,649,108 A | * | 7/1997 | Spiegel et al. | 709/241 |
| 5,781,537 A | * | 7/1998 | Ramaswami et al. | 370/254 |
| 5,831,975 A | * | 11/1998 | Chen et al. | 370/256 |
| 6,175,870 B1 | * | 1/2001 | Gawlick et al. | 709/227 |

FOREIGN PATENT DOCUMENTS

| | | | |
|---|---|---|---|
| EP | 0765101 A2 | 3/1997 | |

OTHER PUBLICATIONS

ATM–User Network Interface Specification (v3.1), Section 5: UNI Signalling, pp. 261–279.
"Structure and use of signalling in B–ISDNs", Ralf O. Onvural et al., 8213 Computer Networks and ISDN Systems 28, Jan. 1996, No. 3, Amsterdam, Netherlands, pp. 307–323.
"Parallel Connection Control (PCC) Algorithm for ATM Networks", Malathi Veeraraghavan et al., Jun. 1996, pp. 1635–1641.

\* cited by examiner

Primary Examiner—Huy D. Vu
Assistant Examiner—Daniel Ryman
(74) Attorney, Agent, or Firm—Laurence A. Greenberg; Werner H. Stemer; Ralph E. Locher

(57) ABSTRACT

A method for controlling a network node and a network having several nodes and terminals. The network node has a plurality of interfaces. One incoming data stream is forwarded from the network node to one of a further network node and a terminal, the network node maintains and stores a connection data stock with connection-related information used to control existing connections to other network nodes, and the connection data stock indicates a data stream designator for an interface and a data stream that is incoming or outgoing at the interface and a data stream direction. Another method uses one terminal as a data source and one as a datasink, each network node forwarding one incoming data stream to one of another network node and a terminal and maintaining a connection data stock with information used to control existing connections to other network nodes, including a data stream designator and a network node interface. Management of existing connections to other network nodes is carried out irrespective of data sink or subscriber-related information. Each network node in a telecommunications network having several network nodes is controlled according to this method. A network node is also provided to implement the method. The invention can be used to easily distribute streams, especially in mass applications.

18 Claims, 1 Drawing Sheet

METHOD FOR CONTROLLING A NETWORK NODE AND A TELECOMMUNICATIONS NETWORK TOGETHER AND A NETWORK NODE

CROSS-REFERENCE TO RELATED APPLICATION

This is a continuation of copending International Application PCT/DE98/01692, filed Jun. 19, 1998, which designated the United States.

BACKGROUND OF THE INVENTION

1. Field of the Invention

The invention lies in the field of communications. The invention relates to a method for controlling a network node in a telecommunications network, a method for controlling a telecommunications network, and a network node. The invention can be used in all application areas in which data or data streams are to be distributed to a plurality of users and/or terminals, and, in particular, where point-to-multipoint connections are to be made available.

The invention is particularly provided for use in teleparticipation applications, i.e., where a user participates in a live event, for example, a sporting event or a discussion, by telecommunication, the intention being that the subscriber will receive at least as much information as if he were personally present. Further possible applications of the invention are, for example, the dissemination of television or video channels to potentially very large groups of recipients (i.e., "pay TV" and "video on demand").

Asynchronous Transfer Mode ("ATM") networks, such as are specified in the documents of the ATM Forum, have a plurality of network nodes and a plurality of terminals. In ATM networks, point-to-multipoint connections can be formed by a root structure over a plurality of network nodes, each of these network nodes forwarding at least one incoming data stream, respectively, to at least one other network node and/or at least one terminal. See Recommendation ITU-T Q.2971 of the International Telecommunication Union. In addition, the document "ATM user-network interface signaling specification" of the ATM Forum (number af-sig-0061.000, July 1996, section 6) describes a process of participation in such a connection initiated by the datasink ("leaf initiated join").

Such means could, in principle, be used to make available a teleparticipation application. However, the method is very costly because two subscriber processes have to be managed for each connected subscriber in each network node through which the connection runs. The subscriber processes communicate with one another with special, subscriber-related messages.

The subscriber processes are also carried out in network nodes that are not connected to terminals but merely forward information to other network nodes. The quantity of information that is to be managed increases exponentially with increasing proximity to the data source (leaf of the root) because the network nodes that are involved in a point-to-multipoint connection form a root structure. For mass applications (for example, the transmission of sporting events with a large number of camera perspectives), the method cannot be used. The method is also unnecessarily complex for a large number of other applications.

SUMMARY OF THE INVENTION

It is accordingly an object of the invention to provide a method for controlling a network node or a telecommunications network, and a network node that overcomes the hereinafore-mentioned disadvantages of the heretofore-known devices and methods of this general type and that make possible the desired distribution of data streams at low cost, and that can also be used economically, particularly for mass applications or for applications with a large number of network nodes involved in a connection.

With the foregoing and other objects in view, there is provided, in accordance with the invention, a method for controlling a network node in a telecommunications network having a plurality of network nodes and a plurality of terminals for a teleparticipation application, including the steps of providing network node with a plurality of interfaces, forwarding at least one incoming data stream from the network node to at least one of a group consisting of at least one further network node and at least one terminal, maintaining, through the network node, a connection data stock with connection-related information that is used to control existing connections to other network nodes of the telecommunications network, and indicating, through the connection data stock, at least a data stream designator for an interface and for a data stream that is incoming or outgoing at the interface and a direction of the data stream.

In accordance with another mode of the invention, there is provided a step of updating the connection data stock only if the network node receives a SETUP message or a message signaling a connection release.

In accordance with a further mode of the invention, there is provided a step of establishing, in reaction to a reception of a SETUP message at an interface ix with a data stream designator g, a connection between an interface iy and the interface ix, in which case either a data stream with the data stream designator g is already received at the interface iy or the SETUP message is forwarded through the interface iy in order to request a setup of a connection for such a data stream.

In accordance with an added mode of the invention, the following steps are performed when a SETUP message is received at an interface ix with a data stream designator g: updating the connection data stock by entering a data stream that is outgoing at the interface ix with the data stream designator g; if there is no incoming data stream with the data stream designator g entered in the connection data stock, selecting an interface iy, forwarding the SETUP message through the interface iy, and updating the connection data stock by entering an incoming data stream at the interface iy with the data stream designator g; and forwarding the data stream that is incoming at the interface iy and has the data stream designator g to the interface ix in accordance with the connection data stock.

In accordance with an additional mode of the invention, there are provided the steps of releasing an existing connection between an interface iy, at which a data stream with the data stream designator g is incoming, and an interface ix when a RELEASE message is received at the interface ix with a data stream designator g, the RELEASE message signaling a connection release initiated by a datasink, and forwarding the RELEASE message through the interface iy if the interface ix was the only interface to which the data stream with the data stream designator g was forwarded for outputting.

In accordance with yet another mode of the invention, the following steps are performed when a RELEASE message is received at an interface ix with a data stream designator g, the RELEASE message signaling a connection release initiated by a datasink: terminating the forwarding of the data stream with the data stream designator g to the interface ix; updating the connection data stock by removing the entry that refers to the interface ix and the data stream with the data stream designator g; and if no further outgoing data stream with the data stream designator g is entered in the connection data stock, forwarding the RELEASE message to that interface iy at which the data stream with the data stream designator g is incoming, and updating the connection data stock by removing the entry referring to the interface iy and the data stream with the data stream designator g.

In accordance with yet a further mode of the invention, the following steps are performed when a message is received that signals a connection release initiated by a data source, the message being received with a data stream designator g: terminating the forwarding of the data stream with the data stream designator g; forwarding the message to all the interfaces through which the data stream with the data stream designator g has been output; and updating the connection data stock by removing all the entries referring to the data stream designator g.

With the objects of the invention in view, there is also provided a method for controlling a telecommunications network having a plurality of network nodes and a plurality of terminals, including the steps of using at least one of the terminals as a data source and at least one of the terminals as a datasink, forwarding, through each network node, at least one incoming data stream to at least one of the group consisting of at least one other network node and at least one terminal, and maintaining, through each network node, a connection data stock with connection-related information that is used to control existing connections to other network nodes of the telecommunications network, including, in the information, at least one indication of a data stream designator and an interface of the network node.

In accordance with yet an added mode of the invention, there is provided the step of maintaining, through the at least one terminal that serves as data source, a connection data stock with connection-related information.

In accordance with yet an additional mode of the invention, there is provided the step of updating, in each network node, the connection data stock only if the network node receives a SETUP message or a message signaling a connection release.

In accordance with again another mode of the invention, there is provided the step of establishing, in each network node, in reaction to a reception of a SETUP message at an interface ix with a data stream designator g, a connection between an interface iy and the interface ix, in which case either a data stream with the data stream designator g is already received at the interface iy or the SETUP message is forwarded through the interface iy in order to request a setup of a connection for such a data stream.

In accordance with again a further mode of the invention, the following steps are performed in each network node when a SETUP message is received at an interface ix with a data stream designator g: updating the connection data stock by entering a data stream that is outgoing at the interface ix with the data stream designator g; if there is no incoming data stream with the data stream designator g entered in the connection data stock, selecting an interface iy, forwarding the SETUP message through the interface iy, and updating the connection data stock by entering an incoming data stream at the interface iy with the data stream designator g; and forwarding the data stream that is incoming at the interface iy and has the data stream designator g to the interface ix in accordance with the connection data stock.

In accordance with again an added mode of the invention, there are provided the steps of releasing, in each network node, an existing connection between an interface iy, at which a data stream with the data stream designator g is incoming, and an interface ix when a RELEASE message is received at the interface ix with a data stream designator g, the RELEASE message signaling a connection release initiated by a datasink, and forwarding the RELEASE message through the interface iy if the interface ix was the only interface to which the data stream with the data stream designator g was forwarded for outputting.

In accordance with again an additional mode of the invention, the following steps are performed in each network node when a RELEASE message is received at an interface ix with a data stream designator g, the RELEASE message signaling a connection release initiated by a datasink: terminating the forwarding of the data stream with the data stream designator g to the interface ix; updating the connection data stock by removing the entry that refers to the interface ix and the data stream with the data stream designator g; and if no further outgoing data stream with the data stream designator g is entered in the connection data stock, forwarding the RELEASE message to that interface iy at which the data stream with the data stream designator g is incoming, and updating the connection data stock by removing the entry referring to the interface iy and the data stream with the data stream designator g.

In accordance with still another mode of the invention, the following steps are performed in each network node when a message is received that signals a connection release initiated by a data source, the message being received with a data stream designator g: terminating the forwarding of the data stream with the data stream designator g; forwarding the message to all the interfaces through which the data stream with the data stream designator g has been output; and updating the connection data stock by removing all the entries referring to the data stream designator g.

With the objects of the invention in view, there is also provided a network node for a telecommunications network having a plurality of network nodes, a plurality of terminals and a plurality of interfaces, the telecommunications network transmitting at least one data stream having a respective at least one data stream designator, the network node including:

a control module with a connection data stock and a connection module, the control module configured to pass on a data stream that is incoming at an interface to at least one other interface, each data stream having a respective data stream designator, the connection data stock containing connection-related information on at least one data stream designator and one interface, and the network node configured to control existing connections to other network nodes of the telecommunication network with reference to the connection-related information.

In accordance with a concomitant feature of the invention, the network node is configured to use at least one of the terminals as a data source and at least one of the terminals as a datasink, to forward at least one incoming data stream to at least one of the group consisting of at least one other network node and at least one terminal, and to maintain a connection data stock with the connection-related information that is used to control existing connections to other network nodes of the telecommunications network, including, in the information, at least one indication of a data stream designator and an interface of the network node.

The invention is based on the basic idea of dispensing with the management of subscribers or terminals that are connected to a network node as much as possible. This is provided at least for existing connections to other network nodes. An existing connection is understood as a connection that is currently not in a setup phase or release phase or in a fault state, exceptional state or other unusual operating state. Connections to other network nodes are understood in contrast to connections that run directly to terminals. Subscriber-related and datasink-related information includes, for example, addresses or other references to a subscriber of the connection, or to a terminal serving as datasink. Connection-related information is to be understood as information that relates to the reception, transmission, and forwarding of data streams through the network node and to the configuration and the internal state of the network node.

As a result of the solution according to the invention, the costly management of subscriber-related or datasink-related information is no longer necessary, or is only necessary to a lesser degree. The only information, or at least the majority of the information, that needs to be stored and managed is connection-related information that is independent of the number of subscribers. As a result, the invention provides extensive savings possibilities in terms of the hardware and software necessary for an application. It is only through the invention that mass applications have become possible.

The invention does not exclude the possibility of subscriber-related or datasink-related information being evaluated, processed, and/or stored for connections that are made directly between the network node and a terminal (data source or datasink). In such connections, the network node is suitable for use as a billing point and/or authentication point. Authentication can be carried out, for example, by a subscriber-related or datasink-related password. For billing, tolls may be charged dependent on the duration of the connection.

However, a network node is preferably not influenced by whether or not datasinks, terminals, or other network nodes are connected to it, or whether the network node is provided as a so-called transfer node exclusively for connecting other network nodes. In one preferred embodiment, the management of existing connections to other network nodes of the telecommunications network takes place independently both of terminal-related and of subscriber-related information, that is to say, independently of information relating to subscribers, data sources, or datasinks.

In addition, the invention does not exclude the possibility of subscriber-related or datasink-related information being evaluated, for example, during the setup phases or release phases of connections to other network nodes. The information can also be stored without the storage, in itself, being a reason for the connection that is set up to be dependent on the information.

In one preferred embodiment, the connection data stock contains, for each active interface and each data stream that is incoming or outgoing at the interface, a data stream designator and an indication of the data flow direction. In the case of a unidirectional data stream, possible directions of the flow of data are "incoming" and "outgoing"; while in the case of potentially bidirectional data streams there is an additional direction of the flow of data in the form of "bidirectional". Apart from the above mentioned information, the connection data stock preferably does not contain any further information, or only contains information that is independent of the type and/or number of connected datasinks and/or terminals and/or subscribers.

The connection data stock is preferably updated as rarely as possible in order to keep the management expenditure low. Updating preferably takes place only in conjunction with a connection setup or a connection release.

A subscriber or a terminal serving as a datasink preferably initiates the connection setup in a decentralized way. In such a case, a connection branch is preferably set up from the terminal to a root-shaped connection structure. The newly set-up connection branch can run through a plurality of network nodes that have not yet been involved in the connection. As soon as the existing connection structure is obtained during the connection setup process, the setup process is terminated, with the result that no expenditure, or only little expenditure, on management is necessary within the existing connection structure.

The release of connection branches also preferably takes place in a decentralized way in reaction to a message originating from a subscriber. The connection release also preferably relates only to that branch of the connection structure that is no longer required, and preferably gives rise to no management expenditure in network nodes that are not directly affected by the connection release. In addition, a possible way of releasing the entire connection structure is preferably provided by a terminal serving as a data source.

Other features that are considered as characteristic for the invention are set forth in the appended claims.

Although the invention is illustrated and described herein as embodied in a method for controlling a network node and a telecommunications network, together, and a network node, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
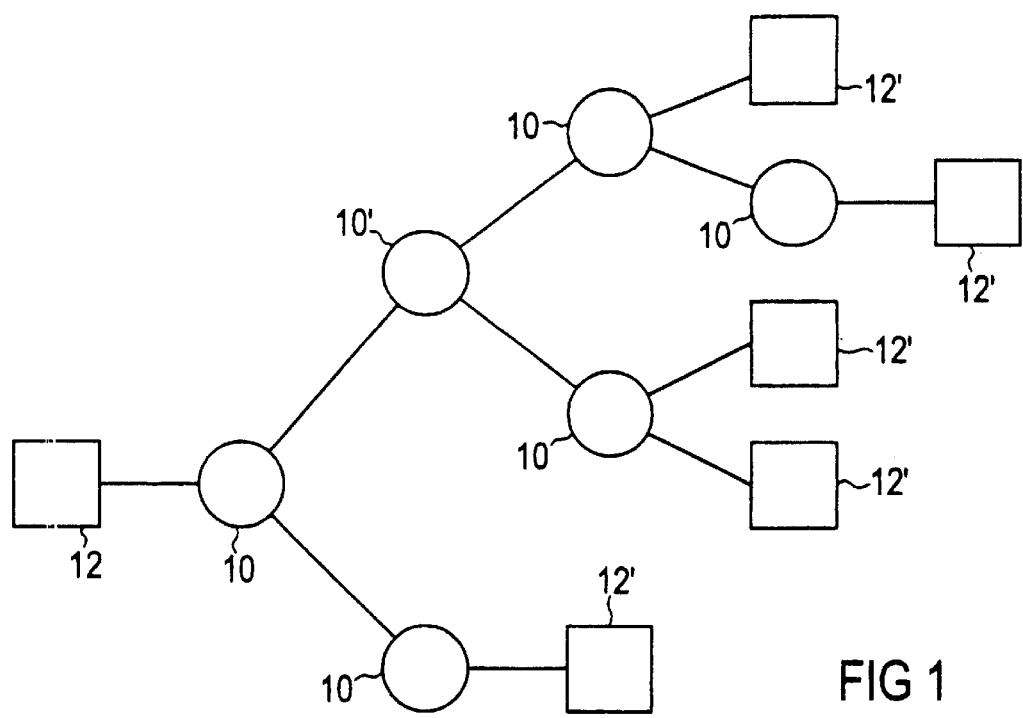
FIG. 1 is a network/nodal diagram of a telecommunications network with terminals and network nodes which are linked to a point-to-multipoint connection.

In all the figures of the drawing, sub-features and integral parts that correspond to one another bear the same reference symbol in each case.

Referring now to the figures of the drawings in detail and first, particularly to FIG. 1 thereof, there is shown elements of a telecommunications network that are involved in a single point-to-multipoint connection of a teleparticipation application.

A plurality of network nodes 10, 10' and a plurality of terminals 12, 12' are connected to one another in a root structure by suitable communication paths, for example, by permanent transmission lines. The entire telecommunications network, which may be, for example, an ATM network, also has further network nodes and terminals that are connected through further communication paths to one another and to the components illustrated in FIG. 1. A plurality of point-to-multipoint connections may also be included in the telecommunications network at the same time.

The terminal 12 forms the leaf of the root. It serves as a data source for a unidirectional data stream that is to be distributed. In other words, it is a provider of the data that is to be transmitted. For example, in the case of television transmission, the terminal 12 can be a television camera connected to a telecommunications device.

Each network node 10, 10' receives the data stream either directly from the terminal 12 or from another network node 10, 10' that is located "nearer" to the leaf of the communications root according to a suitable metric, it being possible for the metric to take into account geographical conditions, properties of the network nodes 10, 10', or the communication paths that are available in the network. The received data stream is reproduced by the network nodes 10, 10' if necessary, and is forwarded away from the root leaf to all the connected terminals 12' and network nodes 10, 10'. In FIG. 1, the network nodes 10 are all connected directly to at least one terminal 12, 12', while the network node 10' is connected exclusively to other network nodes 10. Network node 10' is, therefore, referred to as a transfer network node. The network nodes 10 and 10' are identical in terms of the properties and functions.

The terminals 12' constitute the "leaves" of the communications tree and, thus, the datasinks for the data stream originating from the terminal 12. For example, each terminal 12' can be a private telecommunications device connected to a television screen of a subscriber.

The data stream generated by the terminal 12 is assigned an unambiguous, global data stream designator that globally identified the entire point-to-multipoint connection shown in FIG. 1. The data stream designator enables, if appropriate, in cooperation with an address of the terminal 12 that serves as tree root, setting up the point-to-multipoint connection by successively connecting the terminals 12' or the corresponding subscribers. Further terminals 12' or network nodes 10, 10' can also be connected at any time to an existing point-to-multipoint connection by using the global data stream designator.

In the simplest case, the data stream designator can be known for a specific point-to-multipoint connection and published, for example, in a schedule publication, if the data stream designator is for a television transmission. However, the subscribers can also determine the data stream designator by using a directory, a search service, or a similar device. In one alternative embodiment, it is also possible to use data stream designators that are valid only for a predefined subsection of the telecommunications network and are converted at the boundaries between the subsections by suitable devices.

The telecommunications network, of which a portion is shown in FIG. 1, also has a conventional telecommunications system for exchanging control messages between the network nodes 10, 10' and the terminals 12, 12' in order to initiate, control, and acknowledge the setup and the release of connections as well as other procedures. In the exemplary embodiment, the control messages are transmitted on the same communication paths as the actual data streams. However, the control messages can be exchanged bidirectionally, whereas only unidirectional data streams are provided for actual data transmission. In alternative embodiments of the invention, transmission paths that are separated from the transmission paths for the data streams can be used for the control messages. Additionally, in alternative embodiments it is possible to provide bidirectional data streams instead of, or in addition to, the unidirectional data streams. A tree-shaped point-to-multipoint connection can also be established using bidirectional data streams by suitably mixing data streams that flow together.

Figure 2:
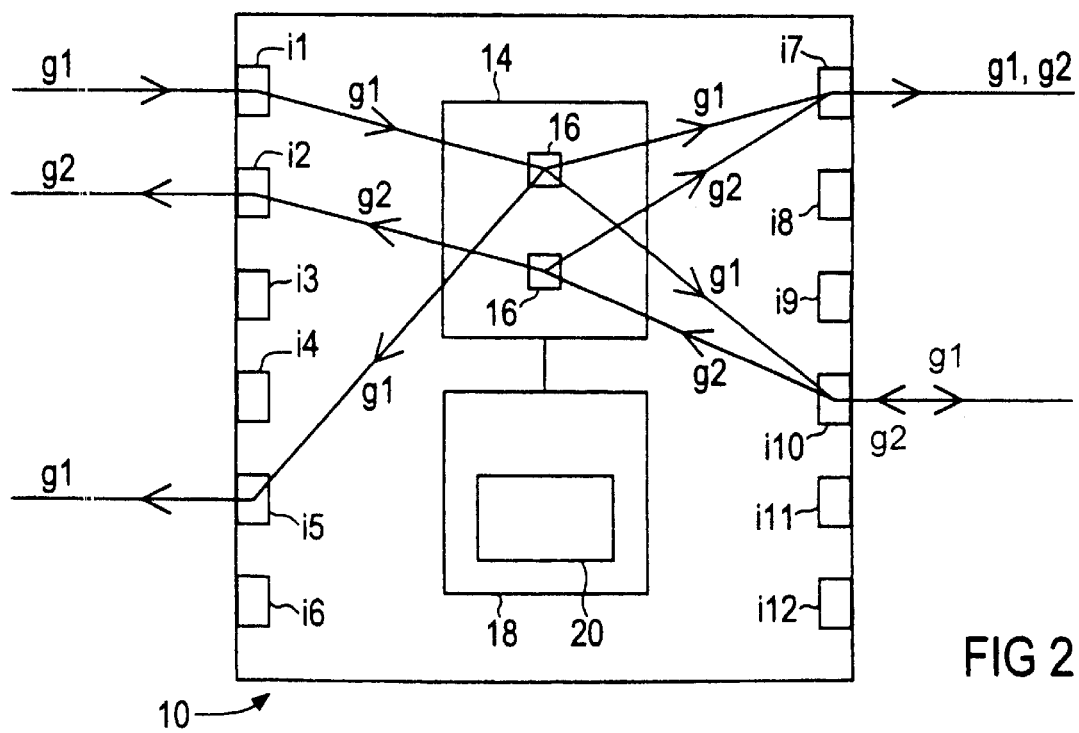
FIG. 2 is a diagrammatic view of a network node.

FIG. 2 illustrates in more detail the structure of one of the network nodes 10, or of the identical network node 10'. In the exemplary embodiment, the network node 10 has twelve interfaces i1, i2, . . . , i12. A plurality of data streams, even a mixture of incoming and outgoing data streams, can be applied simultaneously to each of the twelve interfaces i1, i2, . . . , i12. Through the connection module 14, which has two connection points 16 in the exemplary embodiment, it is possible to forward a data stream that is incoming at an interface i1, i2, . . . , i12, to one or more interfaces i1, i2, . . . i12 to be output to further network nodes 10, 10' or terminals 12'. The term "interface" is to be understood here as the logical interface. In the exemplary embodiment, an interface i1, i2, . . . , i12 corresponds precisely to a physical input/output line of the network node 10, for example, an optical-fiber line. However, in alternative embodiments, the signals of a plurality of interfaces i1, i2, . . . , i12 can also be multiplexed onto one input/output line, or a plurality of input/output lines can be connected to one interface i1, i2, . . . , i12.

A control module 18 having a memory for a connection data stock 20 controls the connection module 14 and the other components of the network node 10. In the exemplary embodiment, the connection module 14 is a hardware circuit, and the control module 18 has a conventional microcomputer with a CPU, a program and data memory, as well as auxiliary modules. In alternative embodiments, the functions of a network node 10 can be distributed as desired between hardware and software components. For example, the hardware portion of the connection module 14 can be reduced to a minimum in that the functions that are associated with the forwarding of the data streams are exported to software modules in a control module 18.

In the connection status of the network node 10 (shown in FIG. 2), a data stream incoming at the interface i1, having data stream designator g1, is forwarded to the interfaces i5, i7 and i10. Also, a data stream incoming at the interface i10, having the data stream designator g2, is output at the interfaces i2 and i7. The connection status is reflected in the connection data stock 20. The connection data stock 20 is a list that contains, for each data stream that is incoming or outgoing at an interface, a triple designation including the name of the interface, the data stream designator, and the direction ("I" for incoming and "O" for outgoing). The following table shows the connection data stock 20 for the connection status illustrated in FIG. 2:

| Interface | Data stream designator | Direction of data flow |
| --- | --- | --- |
| i1 | g1 | I |
| i2 | g2 | O |
| i5 | g1 | O |
| i7 | g1 | O |
| i7 | g2 | O |
| i10 | g1 | O |
| i10 | g2 | I |

From the table, it is clear that a plurality of data streams with different data stream designators can be forwarded and received through one interface. However, in the connection data stock 20, there must be, for each incoming data stream, at least one entry of the incoming data stream in the outgoing direction (through a different interface). Additionally, there can then only be one outgoing data stream in the connection data stock 20 if the data stream is also registered as being incoming.

Only the directional information "incoming" and "outgoing" are possible in the unidirectional data streams that are under consideration in the exemplary embodiment. In alternative embodiments, which additionally provide bidirectional data streams, the directional information can also read as "bidirectional."

When the network node 10 is in operation in the connection status shown in the table, the network node 10 forwards the data streams g1 and g2 in the manner described above. The operation is, therefore, based merely on the connection-related information contained in the table. Information relating to connected terminals 12, 12' or subscribers or providers is not required, and is, accordingly, not evaluated or stored by the network node 10 either. The scope of the connection data stock 20 and of the expenditure on management is, therefore, independent of the number of terminals 12, 12' or subscribers connected to a point-to-multipoint connection.

The signaling system of the telecommunications network is used to set up and release connections of the point-to-multipoint connection as a whole and of the connection branches forming it. To be more precise, in the exemplary embodiment, signals are provided for initiating the connection setup (referred to below as SETUP message) and for initiating or releasing a connection (referred to below as RELEASE message). In alternative embodiments, other messages with modified meanings and/or additional messages are used. Such additional messages can be provided, for example, for displaying a successful connection setup (CONNECT message), for displaying fault statuses, or for terminating the entire telecommunications application by the data source.

The methods for setting up and releasing connections, which occur during the telecommunications application described here in the example of a teleparticipation system, are explained in more detail below.

1. Admission of a Subscriber

The subscribers being successively connected to data provided by a provider carry out the setup of a point-to-multipoint connection in a decentralized fashion. Subscriber admission is initiated by the subscriber or the terminal 12' that serves as datasink in that a setup message is sent to a network node 10 that is connected to the terminal 12'. If the network node 10 is already connected to the point-to-multipoint connection, the network node 10 forwards the requested data stream directly to the admitted terminal 12'. Otherwise, the network node 10 itself establishes a connection to the data stream by forwarding the SETUP message to a further network node 10, 10' that is either connected to the point-to-multipoint connection or is at least "closer" to the point-to-multipoint connection (according to a suitable metric).

Thus, for a subscriber to be admitted, the connection branch that is outgoing from the terminal 12' (as a future leaf in the tree-shaped connection structure) is set up in the direction of the already existing connection structure. In the exemplary embodiment, the terminal 12 which forms the data source learns of the admission of a subscriber only if the new connection branch adjoins the existing connection structure first at the terminal 12 so that the local interface configuration at the terminal 12 has to be changed. Otherwise, the terminal 12 is not affected by the connection of a subscriber. However, in alternative embodiments, there may be provision for a message that indicates the connection is to be forwarded in all cases to the terminal 12 in order to start a billing process, for example.

In the exemplary embodiment, the SETUP message contains a data stream designator and a data source address. The data stream designator identifies the point-to-multipoint connection at which the admission is to take place. The data source address contains information making it possible to forward SETUP messages in the direction of the data source, or of the existing tree structure. Both the data stream designator and the data source address are available globally and are known to the subscriber or terminal 12' that is being admitted, for example, from a schedule publication, a suitable directory, or a database.

In alternative embodiments, the SETUP message can have further parameters, for example, an indication that it relates to an admission to a teleparticipation application. Additionally, in further alternative embodiments, the data stream designator may itself already have the information necessary for routing the SETUP messages in the telecommunications network. Accordingly, a separate data source address is unnecessary.

If a network node 10, 10' receives a SETUP message from the data stream designator g at an interface ix, the data stream designator g is first entered (as designator for a data stream that is outgoing at the interface ix) into the connection data stock 20 by adding the triple designation (ix, g, O) to the connection data stock 20.

The control module 18 of the network node 10, 10' then checks whether or not a data stream with the data stream designator g has already been received, that is to say whether the connection data stock 20 contains a triple designation (iy, g, I) for an interface iy. If such is the case, the network node 10, 10' also forwards all future data that is incoming with the data stream designator g through the interface ix in the direction of the terminal 12'. In alternative embodiments that provide a CONNECT message, the network node 10, 10' also transmits such a message to provide acknowledgement of the successful connection to the terminal 12' that serves as a datasink. The connection setup process is, thus, terminated; particularly, the SETUP message is, in this case, no longer forwarded in the direction of the data source.

If no data stream with the data stream designator g is received at the network node 10, 10' the network node 10, 10' selects, on the basis of the data source address, an interface iz in order to set up a connection in the direction of the data source. By adding the triple designation (iz, g, I), the interface iz is entered for the data stream g as an incoming interface into the connection data stock 20. Additionally, the SETUP message is forwarded through the interface iz in order to set up the connection that originates from the datasink and leads to the data source. A further network node 10, 10' that contains the forwarded SETUP message handles the forwarded SETUP message in accordance with the method just described, that is to say, as if the SETUP message originated directly from a terminal 12'.

2. SETUP Message Arrives at the Terminal 12 Forming the Data Source

The terminal 12 that forms the data source has a similar structure to the network node 10 shown in FIG. 2. In particular, the terminal 12 also has at least one interface and one connection data stock 20, but only outgoing connections are provided.

Based on the admission method described in section 1 above, the data source receives at most just one SETUP message (connection request) for each data stream and each interface. If such a message arrives at an interface ix with a data stream designator g, the data source first checks a number of fault conditions. For example, the data source address contained in the SETUP message must correspond to the data source address of the terminal 12, and the data stream designator g must be valid. If a fault is detected at this point, the terminal 12 transmits, in the exemplary embodiment, a global RELEASE message through the interface ix. The effect of the global RELEASE message is represented below in Section 5.

If no faults are detected, the terminal 12 accepts the interface ix as an interface for an outgoing data stream with the designator g into the connection data stock 20 and then transmits the data stream (or exclusively if the SETUP message originated from the first subscriber) through the interface ix. Additionally, in alternative embodiments that provide a CONNECT message, the terminal 12 transmits such a message to acknowledge the connection setup through the interface ix.

3. Subscriber Leaves the Telecommunications Application

As in the case of connection setup, individual subscribers can leave the point-to-multipoint connection without the other subscribers or the data source being affected by the exit. In the case of a connection release that is initiated by a subscriber or a terminal 12' that serves as a data source by a release message (RELEASE message), only that branch of the tree-shaped connection structure that is no longer required is released. The RELEASE message is propagated from the terminal 12', which represents a leaf in the connection structure, in the direction of the root (the terminal 12) until it hits a network node 10, 10', which also serves other terminals 12' and/or network nodes 10, 10' and, therefore, cannot release its participation in the connection.

If a network node 10, 10' receives a RELEASE message with a data stream designator g through an interface ix, the network node 10, 10' first checks whether the data stream is entered as incoming or outgoing in the connection data stock 20 at the interface ix. In the case of an incoming data stream, the message is a global release message from the data source whose handling is described below in Section 5.

If the data stream with the designator g at the interface ix is, on the other hand, registered as outgoing (which does not exclude the possibility that the RELEASE message that serves as a control message has not been received at the interface because control messages are transmitted bidirectionally), a release request from a datasink or a subscriber is present. The entry that relates to the data stream and the interface, that is to say the triple designation (ix, g, O), is subsequently removed from the connection data stock 20, and the data of the data stream g is no longer forwarded through the interface ix.

If at least one further interface for outputting the data stream g is active in the network node 10, 10' the connection release is, thus, terminated. The network node 10, 10' transfers the data stream g onwards to this other interface or other interfaces, and the RELEASE message is not forwarded to the data source. In addition, in one alternative embodiment, an acknowledgement message (for example a RELEASE-COMPLETE message depending on the signaling protocol used) is output to the datasink.

If the connection release has affected the last interface of the network node 10, 10' to be active for outputting the data stream g, and there is, therefore, no further entry of the form (iy, g, O) for an interface iy in the connection data stock 20, the release process propagates in the direction of the tree root. For this purpose, there is a search for the interface iz at which the data stream g is received, in other words, an entry (iz, g, I) in the connection data stock 20. The entry is removed from the connection data stock 20, and the RELEASE message is forwarded to the next network node 10, 10' that is nearer to the tree root through the interface iz.

The network node 10, 10' then handles the RELEASE message in the way described in this section, as if it originated from a terminal 12'.

If a RELEASE message arrives at the terminal 12 acting as a data source (in other words, the last subscriber supplied through a specific interface has released the connection to the data stream), the terminal 12 closes the interface and removes the corresponding entry from its connection data stock 20. However, the connection can be re-energized if a new subscriber is admitted (see Section 2 above).

4. Telecommunications Application Is Terminated by the Data Source

If the terminal 12 that serves as data source wishes to terminate the telecommunications application with the data stream designator g, it transmits a RELEASE message through all the interfaces ix that are active for this data stream, and then terminates the transmission of the data stream g through these interfaces. The corresponding entries in the connection data stock 20 of the terminal 12 are removed.

5. Network Node 10, 10' Receives a RELEASE Message Originating from the Terminal 12 that Forms the Data Source A RELEASE message that is incoming at a network node 10, 10' through an interface ix and that has a data stream designator g is (as already described in Section 3 above) first checked to determine whether it is a connection release that is initiated by a subscriber or by the data source. In the first case, which occurs if the data record (ix, g, O) is present in the connection data stock 20, the RELEASE message is handled according to Section 3 above.

In the second case, which occurs if the data record (ix, g, I) is present in the connection data stock 20, the data record is first removed from the connection data stock 20. Then, all the interfaces that are active for outputting the data stream g are determined. The RELEASE message is forwarded to these interfaces, and the corresponding entries are removed from the connection data stock 20. In addition, in one alternative embodiment in which an acknowledgement message is necessary after the signal protocol that is used, the acknowledgement message (for example a RELEASE-COMPLETE message) is output to the data source.

Both in the case of the connection release method described in Section 3 and in the case of the connection release message described in this section, it is possible for two RELEASE messages that originate from a subscriber or from the data source to cross over. Under such circumstances, the later message reaches a network node 10, 10' only if the network node 10, 10' has already released the connection with the designator g, and, accordingly, there are no longer any respective entries contained in the connection data stock 20. Under such circumstances, the network node 10, 10' rejects the RELEASE message that arrives later. Under such circumstances also, in one alternative embodiment, a RELEASE-COMPLETE message is output through that interface at which the rejected RELEASE message has been received.

In the exemplary embodiment, there is a provision for the data source to be able to terminate the entire telecommunications application by transmitting a RELEASE message. The RELEASE message that is transmitted by the data source does not differ here from the RELEASE messages that originate from the datasinks. As is described in Sections 3 and 5, each network node 10, 10' recognizes the meaning of a RELEASE message that is incoming at an interface ix from whether an incoming or outgoing direction of data flow is noted for the respective data stream at the interface ix in the connection data stock 20.

In one alternative embodiment, there is a provision for the RELEASE message to be used exclusively for the connection release initiated by a datasink, and for a different release message to be used for terminating the telecommunications application through the data source. Therefore, the terminal 12 transmits the other release message (instead of the RELEASE message described in Section 4) if the telecommunications application is to be terminated. In order to distinguish between the two aforesaid cases, the network nodes 10, 10' then do not need to evaluate the direction of data flow stored in the connection data stock 20. For this reason, an alternative embodiment is provided particularly for use in systems that permit bidirectional data connections. In the alternative embodiment, the RELEASE message is, therefore, always processed by the network nodes 10, 10' (that is to say without testing the data flow direction) according to the method described in Section 3, and the other release messages are always processed according to the method illustrated in Section 5.

I claim:

1. A method for controlling a network node in a telecommunications network having a plurality of network nodes and a plurality of terminals for a teleparticipation application, such that a source of a data stream of the teleparticipation application to and the remainder of the telecommunications network that is to receive the data stream forms a point-to-multipoint connection, the method which comprises:

providing a network node, forming the point in the telecommunications network that provides the source of the data stream, with a plurality of interfaces;

forwarding at least one incoming data stream from the network node to at least one of a group consisting of a further network node and at least one terminal;

maintaining globally on the telecommunications network, through the network node, a centralized database with records containing a global data stream designator that globally identifies the entire point-to-multipoint connection information that is used to control existing connections to other network nodes of the telecommunications network that are to receive the data stream of the teleparticipation application;

indicating, through a centralized database record of the database, at least a designator for an interface, a designator for a data stream that is incoming or outgoing at the interface, and a direction of the data stream; and establishing by the further network node, in reaction to a reception of a SETUP message at an interface ix with a data stream designator g of the database record, a connection between an interface iy and the interface ix, in which case either a data stream with the data stream designator g is already received at the interface iy or the SETUP message is forwarded through the interface iy in order to request a setup of a connection for such a data stream;

wherein the further network node, that is to receive the data stream as a data sink, establishes the connection in a direction of an already existing connection structure formed by at least the network node for forwarding the data stream, such that the connection setup to the datastream is initiated in a decentralized way.

2. The method according to claim 1, including the step of updating the centralized database only if the network node receives a SETUP message or a message signaling a connection release.

3. The method according to claim 1, including performing the following steps when a SETUP message is received at an interface ix with a data stream designator g:
   updating the centralized database by entering a data stream that is outgoing at the interface ix with the data stream designator g;
   if there is no incoming data stream with the data stream designator g entered in the centralized database, selecting an interface iy, forwarding the SETUP message through the interface iy, and updating the centralized database by entering an incoming data stream at the interface iy with the data stream designator g; and
   forwarding the data stream that is incoming at the interface iy and has the data stream designator g to the interace ix in accordance with the centralized database.

4. The method according to claim 1, including the steps of releasing an existing connection between an interface iy, at which a data stream with the data stream designator g is incoming, and an interface ix when a RELEASE message is received at the interface ix with a data stream designator g, the RELEASE message signaling a connection release initiated by a datasink, and forwarding the RELEASE message through the interface iy if the interface ix was the only interface to which the data stream with the data stream designator g was forwarded for outputting.

5. The method according to claim 1, including performing the following steps when a RELEASE message is received at an interface ix with a data stream designator g, the RELEASE message signaling a connection release initiated by a datasink:
   terminating the forwarding of the data stream with the data stream designator g to the interface ix;
   updating the centralized database by removing the entry that refers to the interface ix and the data stream with the data stream designator g; and
   if no further outgoing data stream with the data stream designator g is entered in the centralized database, forwarding the RELEASE message to that interface iy at which the data stream with the data stream designator g is incoming, and updating the centralized database by removing the entry referring to the interface iy and the data stream with the data stream designator g.

6. The method according to claim 1, including performing the following steps when a message is received that signals a connection release initiated by a data source, the message being received with a data stream designator g:
   terminating the forwarding of the data stream with the data stream designator g;
   forwarding the message to all the interfaces through which the data stream with the data stream designator g has been output; and
   updating the centralized database by removing all the entries referring to the data stream designator g.

7. The method of claim 1, wherein the further network node establishes the connection using network nodes that are not involved in the existing connection structure.

8. A method for controlling a telecommunications network having a plurality of network nodes and a plurality of terminals, such that a source of a data stream of the telecommunications network and the network node(s)/terminal(s) form, a point-to-multipoint connection which comprises:
   using at least one of the terminals as a data source and at least one of the terminals as a datasink;
   forwarding, through each network node, at least one incoming data stream to at least one of the group consisting of another network node and at least one terminal;
   maintaining globally on the telecommunications network, through for each network node, a centralized database including a global data stream designator that globally identifies the entire point-to-multipoint connection with records containing connection-related information that is used to control existing connections to other network nodes of the telecommunications network;
   including, in the connection-related information, at least a designator for an interface, a designator for a data stream that is incoming or outgoing at the interface, and a direction of the data stream; and
   establishing, in reaction to a reception of a SETUP message at an interface ix with a data stream designator g of the connection-related information of the centralized database, a connection between an interface iy and the interface ix, in which case either a data stream with the data stream designator g is already received at the interface iy or the SETUP message is forwarded through the interfacely in order to request a setup of a connection for such a data stream;
   wherein the another network node, that is to receive the data stream as a data sink, establishes the connection in a direction of an already existing connection structure formed by at least one of the forwarding network nodes such that the connection setup to the datastream is initiated by the data sink in a decentralized way.

9. The method according to claim 8, including the step of maintaining, through the at least one terminal that serves as data source, the centralized database with the records containing the connection-related information.

10. The method according to claim 8, including the step of updating, in each network node, the centralized database only if the network node receives a SETUP message or a message signaling a connection release.

11. The method according to claim 8, including performing the following steps in each network node when a SETUP message is received at an interface ix with a data stream designator g:
   updating the centralized database by entering a data stream that is outgoing at the interface ix with the data stream designator g;
   if there is no incoming data stream with the data stream designator g entered in the centralized database, selecting an interface iy, forwarding the SETUP message through the interface iy, and updating the centralized database by entering an incoming data stream at the interface iy with the data stream designator g; and
   forwarding the data stream that is incoming at the interface iy and has the data stream designator g to the interface ix in accordance with the centralized database.

12. The method according to claim 8, including the steps of releasing, in each network node, an existing connection between an interface iy, at which a data stream with the data stream designator g is incoming, and an interface ix when a RELEASE message is received at the interface ix with a data stream designator g, the RELEASE message signaling a connection release initiated by a datasink, and forwarding the RELEASE message through the interface iy if the interface ix was the only interface to which the data stream with the data stream designator g was forwarded for outputting.

13. The method according to claim 8, including performing the following steps in each network node when a RELEASE message is received at an interface ix with a data stream designator g, the RELEASE message signaling a connection release initiated by a datasink:

terminating the forwarding of the data stream with the data stream designator g to the interface ix;

updating the centralized database by removing the entry that refers to the interface ix and the data stream with the data stream designator g; and if no further outgoing data stream with the data stream designator g is entered in the centralized database, forwarding the RELEASE message to that interface iy at which the data stream with the data stream designator g is incoming, and updating the centralized database by removing the entry referring to the interface iy and the data stream with the data stream designator g.

14. The method according to claim 8, including performing the following steps in each network node when a message is received that signals a connection release initiated by a data source, the message being received with a data stream designator g:

terminating the forwarding of the data stream with the data stream designator g;

forwarding the message to all the interfaces through which the data stream with the data stream designator g has been output; and updating the centralized database by removing all the entries referring to the data stream designator g.

15. The method of claim 8, wherein the another network node establishes the connection using network nodes that are not involved in the existing connection structure.

16. A network node for a telecommunications network having a plurality of network nodes, a plurality of terminals and a plurality of interfaces, the telecommunications network transmitting at least one data stream from a point to a multipoint connection having a respective at least one data stream designator that globally identifies the entire point-to-multipoint connection, the network node comprising:

a control module with access to a database located globally on the telecommunications network and a connection module, said control module configured to pass on a data stream that is incoming at an interface ix to at least one other interface iy, each data stream having a respective data stream designator, said centralized database having records containing connection-related information on at least one data stream designator and one interface, and said network node configured to control existing connections to other network nodes of the telecommunication network with reference to the connection-related information;

said control module configured for establishing, in reaction to a reception of a SETUP message at the interface ix with a data stream designator g, a connection between the interface iy and the interface ix, in which case either a data stream with the data stream designator g is already received at the interface iy or the SETUP message is forwarded through the interface iy in order to request a setup of a connection for such a data stream;

wherein the control module, that is to pass on the data stream to the connection module as a data sink, establishes the connection in a direction of an already existing connection structure formed by at least one of the network nodes that transmits the data stream such that the connection setup to the datastream is initiated in a decentralized way.

17. The network node according to claim 16, wherein said network node is configured to use at least one of the terminals as a data source and at least one of the terminals as a datasink, to forward at least one incoming data stream to at least one of the group consisting of at least one other network node and at least one terminal, and to maintain said centralized database having the records containing the connection-related information that is used to control existing connections to other network nodes of the telecommunications network, including, in the information, at least one indication of a data stream designator and an interface of the network node.

18. The network node of claim 16, wherein the control module establishes the connection using network nodes that are not involved in the existing connection structure.

* * * * *

UNITED STATES PATENT AND TRADEMARK OFFICE
CERTIFICATE OF CORRECTION

PATENT NO. : 6,826,190 B1  
APPLICATION NO. : 09/489542  
DATED : November 30, 2004  
INVENTOR(S) : Bernhard Petri Page 1 of 1

It is certified that error appears in the above-identified patent and that said Letters Patent is hereby corrected as shown below:

Item [30] should read as follows:

Jul. 21, 1997          (DE)          . . . . . . . . . .  197 31 289.6

Signed and Sealed this

Twenty-ninth Day of August, 2006

JON W. DUDAS  
*Director of the United States Patent and Trademark Office*